Feb. 27, 1934.  L. O. CLARK  1,949,268
METHOD OF MOUNTING A SEA GROWTH SPECIMEN
Filed Aug. 24, 1931
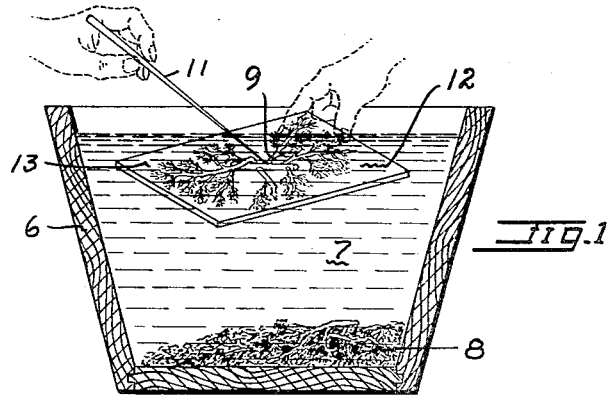
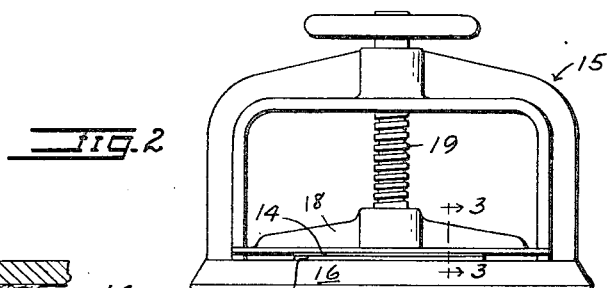
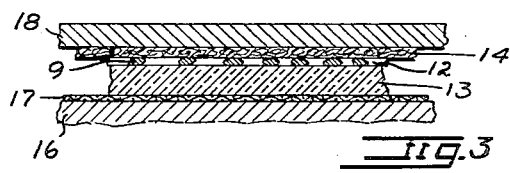
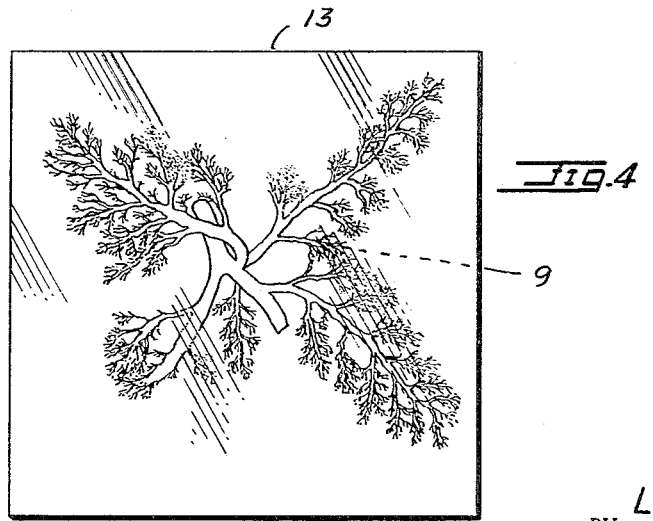
INVENTOR.
LEORA O. CLARK
BY Henry N. Young
ATTORNEY Patented Feb. 27, 1934

1,949,268

UNITED STATES PATENT OFFICE 1,949,268

METHOD OF MOUNTING A SEA GROWTH SPECIMEN

Leora O. Clark, Oakland, Calif.

Application August 24, 1931. Serial No. 558,878

1 Claim. (Cl. 41—34)

The invention relates to the application of specimens of sea growth to provide decorative elements of decorative and novelty articles.

An object of the invention is to provide articles of the class described wherein the decorative elements comprise permanent parts thereof.

Another object of the invention is to provide for the application of sea growth specimens as ornamentation in such a manner that all parts thereof are fixed to the supporting element and lie flat thereagainst.

A further object is to provide for the mounting of sea growth specimens on transparent panes of glass or the like for viewing through said panes.

Yet another object is to provide a particularly simple and effective method of mounting the specimens in place.

The invention possesses other objects and features of advantage, some of which, with the foregoing, will be set forth or be apparent in the following description of typical embodiments of the invention which are illustrated in the accompanying drawing, in which, Figure 1 is a view showing the manner of initially applying a sea growth specimen to a member which is to provide a support or backing therefor.

Figure 2 is a view showing a step in the process of producing an article in accordance with my invention and by use of a press.

Figure 3 is an enlarged fragmentary section taken at 3—3 in Figure 2.

Figure 4 shows a sea growth specimen mounted on a transparent pane in accordance with the disclosed method, and viewed through the pane.

In producing decorations of sea growths, it is highly desirable that the same be securely held in place and that the color and form of a specimen should be retained. For accomplishing the latter feature, a mounting of the specimen in flat pressed condition is particularly advantageous, and it is to a method of application for producing the desired results that the present invention particularly relates. In the present instance, the invention is specifically applied to the use of specimens of sea algæ which are more commonly referred to as sea mosses, kelps, etc., and the term sea growth herein used is intended to cover vegetation which grows under water, whether fresh or salt.

Since sea growths such as that particularly illustrated, provide more or less intricate designs, it is primarily necessary that the parts of a specimen be so disposed on a surface which is to carry them as to bring out the beauty thereof. To this end, it is applicant's preferred practice to place the specimen on a surface to be decorated while the specimen and surface are wet, and to arrange the specimen parts as desired while they are more or less floating in the water. In Figure 1 a tank or vessel 6 is shown, said vessel containing a liquid 7 in which a mass of the sea growth 8 is placed for soaking. When the sea growth specimens have been thoroughly soaked, the surface to be decorated is placed within the liquid in the vessel and a sea growth specimen 9 is separated from the mass 8 and placed on said surface. For disposing the specimen parts as desired, a pointer 11 may be used in the manner indicated.

The liquid 7, it is noted, will usually be fresh or salt water, but may, on occasion, be some other liquid. In the present instance the surface to be decorated is a face 12 of a glass pane 13. It will be understood, however, that cards or other articles may be disposed to have the surface thereof to be decorated within the liquid 7, said liquid hereinafter being referred to as water.

When the specimen 9 is suitably arranged on the face 12, the pane 13 is removed from the water and laid on a suitable supporting surface. A sheet 14 of blotting material is placed over the specimen, and pressure is then evenly applied for flat-pressing the specimen against the face 12. When the article to be decorated comprises a flat sheet or pane, as in the present instance, a screw-press 15 may be utilized for exerting the required pressure.

As particularly illustrated in Figures 2 and 3, the pane 13 is supported on the platen 16 of the press, with a thin fabric pad 17 interposed between the pane and platen. The movable press plate 18 engages the upper side of the blotter sheet 14 and its position is controlled by means of a usual screw 19 whereby the pressure may be regulated.

In applying a sea growth specimen in accordance with the present invention, the pressure is desirably applied in a particular manner. When the pane and specimen have been placed in the press in the described arrangement, a relatively low pressure is brought to bear on the specimen for effecting an initial flattening of the specimen and to cause the absorption of excess moisture by the blotter sheet 14. When the sheet 14 becomes moist the same is replaced with a dry and similar sheet and an increasing degree of pressure is exerted, the process of replacing the blotters and applying increased pressure being repeated until the specimen is substantially dry and is completely flattened out against the surface 12.

It will now be noted that as the surface water is removed from the specimen, the sap thereof will be extruded by reason of the pressure. In the case of sea growths, the sap thereof is found to have a high degree of adhesive quality whereby the extruded sap between the specimen and surface 12 becomes so strongly adhesive, as it is dried out under pressure and by the successive blotter sheets 14, that it functions as the sole adhesive necessary to fix the specimen to a pane. It will thus be understood that the pressing out of the specimen not only flattens the same but also effects its adhesive fixing to the surface to which it is applied and without necessitating the application of a special adhesive between the specimen and surface. This use of the extruded sap as an adhesive avoids the possibility of color changes which might occur in the specimen if a separate adhesive were used, and no excess of adhesive remains at the edges of the specimen portions. The present pressure process of effecting a flat-pressed and adherent fixture of the specimen to the receiving surface causes no color changes in the specimen, since the drying under, and by reason of, pressure is effected with such rapidity that light and temperature may not affect the specimen while it is being dried in place. The fact that the specimen provides its own adhesive results, of course, in the utmost economy of material and labor.

It will now be noted that a transparent pane carrying a specimen in the manner shown and described may be mounted in front of a background (not shown) and for the viewing of the mounted specimen through the pane. The specimen is thus independent of the background, and is arranged to maintain its shape on the pane which carries it. By the present method, sea-growth specimens have also been placed on sheets of correspondence paper and on correspondence cards or the like; when so placed, the specimens are found to be so flat and uniform as to thickness as to appear as engraving on the supporting surface.

From the foregoing description taken in connection with the accompanying drawing, the advantages of the product and the method of producing the same will be readily understood by those skilled in the art to which the invention appertains, and while I have described a specific product and method which I now consider to be the best embodiments thereof, I desire to have it understood that the specific disclosure is merely illustrative, and that such changes may be made, when desired, as fall within the scope of the appended claim.

Having thus described my invention, I claim as new and desire to secure by Letters Patent of the United States the following:

The method of mounting a specimen of algæ on a pane of glass by the use of liquid-absorbent sheets and a press having relatively movable and opposed pressure plates, which comprises the steps of applying one face of the specimen in flat-spread condition against a surface of the pane, applying a said liquid-absorbent sheet against the other face of the specimen, engaging the assembly of the pane and specimen and sheet between the press plates, and alternately compressing said assembly at relatively high pressures to express the sap and moisture from the specimen and replacing the sheet of the assembly, successive said compression steps being effected at progressively increasing unit pressures.

LEORA O. CLARK.